US007281837B2

(12) United States Patent
Yue et al.

(10) Patent No.: US 7,281,837 B2
(45) Date of Patent: Oct. 16, 2007

(54) TRANSFLECTIVE FRAME AND BACKLIGHT MODULE USING THE SAME

(75) Inventors: Guo-Han Yue, Shen-Zhen (CN); Tung-Ming Hsu, Tu-Cheng (TW)

(73) Assignees: Hong Fu Jin Precision Industry (Shenzhen) Co., Ltd., Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/316,587

(22) Filed: Dec. 21, 2005

(65) Prior Publication Data

US 2006/0139949 A1 Jun. 29, 2006

(30) Foreign Application Priority Data

Dec. 28, 2004 (TW) .............................. 93140951 A

(51) Int. Cl.
*F21V 7/04* (2006.01)
(52) U.S. Cl. ....................................... 362/623; 362/615
(58) Field of Classification Search ................ 362/600, 362/623, 632–634, 603, 606–609, 615; 40/541, 40/543, 546–547, 549, 579, 583
See application file for complete search history.

(56) References Cited

U.S. PATENT DOCUMENTS

| 6,074,069 | A  | * | 6/2000 | Chao-Ching et al. | .......... 362/26 |
| 6,914,652 | B2 | * | 7/2005 | Iijima | .......... 349/114 |
| 7,123,318 | B2 | * | 10/2006 | Nagakubo et al. | .......... 349/74 |
| 2004/0233359 | A1 | * | 11/2004 | Nam et al. | .......... 349/114 |
| 2004/0257496 | A1 | * | 12/2004 | Sonoda et al. | .......... 349/95 |
| 2005/0140878 | A1 | * | 6/2005 | Kim et al. | .......... 349/114 |

* cited by examiner

*Primary Examiner*—Thomas M. Sember
*Assistant Examiner*—Julie A. Shallenberger
(74) *Attorney, Agent, or Firm*—Morris Manning Martin LLP; Tim Tingkang Xia, Esq.

(57) ABSTRACT

A backlight module (1) includes a light source (92), a light guide plate (80), and a frame (60). The frame contains the light source and the light guide plate. The frame includes a base plate (65) defining a transflective region (651) and a plurality of holes (652) defined in the transflective region. A portion of light beams from the light source is reflected by the transflective region out one main face of the backlight module, and a remainder of the light beams passes through the transflective region to emit from another main face of the backlight module. The backlight module and frame provide a double-sided emitting structure for a double-sided LCD. This avoids the need for an expensive transflector.

14 Claims, 4 Drawing Sheets

TRANSFLECTIVE FRAME AND BACKLIGHT MODULE USING THE SAME

BACKGROUND

1. Field of the Invention

The present invention relates to a frame and a double-sided emitting backlight module using the same.

2. General Background

Most portable electronic devices such as laptops, notebook computers, mobile phones, and game devices have flat panel displays (FPDs) as viewing screens, quite unlike the bulky cathode-ray-tube (CRT) monitors of, say, conventional desktop computers. Users of the portable electronic devices still expect the viewing screens to provide performance equal to that of CRT monitors. To meet this demand, computer manufacturers have sought to build FPDs offering superior resolution, color, and contrast, while at the same time requiring minimal power consumption. Liquid crystal displays (LCDs) are one type of FPD which satisfy these expectations. However, the liquid crystals of an LCD are not self-luminescent. Rather, the LCD needs a backlight module which offers sufficient luminance (brightness) in a wide variety of ambient light environments.

Nowadays both single-sided and double-sided LCD displays are in widespread use in various electronic devices. Referring to FIG. 4, a conventional double-sided LCD is shown. The LCD 100 includes a backlight module (not labeled), a first liquid crystal panel 140, and a second liquid crystal panel 150. The backlight module includes a light guide plate 110, a light source 112, a transflector 116, a first set of optical films 120, and a second set of optical films 30.

The light guide plate 110 includes a first surface 110*a*, a second surface 110*b*, a third surface 110*c*, and a fourth surface 110*d*. The first set of optical films 120 includes a first diffuser 121, a first brightness enhancement film 122, a second brightness enhancement film 123, and a second diffuser 124. The second set of optical films 130 includes a third diffuser 131, a third brightness enhancement film 132, a fourth brightness enhancement film 133, and a fourth diffuser 134.

The light source 112 is disposed adjacent to the third surface 110*c* of the light guide plate 110. A light reflector 113 partially covers the light source 112. The first set of optical films 120 is disposed on the first surface 110*a* of the light guide plate 110. The transflector 116 and the second set of optical films 130 are sequentially disposed under the second surface 110*b* of the light guide plate 110. The first and second sets of optical films 120, 130 are used to improve the brightness and uniformity of the backlight module. A reflector 115 is adhered to the fourth surface 110*d* of the light guide plate 110.

The transflector 116 comprises a plurality of extremely thin layers. The layers comprise metal particles, and define minute holes or concavities therein. The transflector 116 thus enables the backlight module to emit light from two main sides thereof. The backlight module and the two liquid crystal panels 140, 150 form the double-sided LCD 100.

However the transflector 116 is generally an expensive component that increases the cost of the backlight module.

What is needed, therefore, is a less expensive backlight module.

SUMMARY

A frame for use in a backlight module includes a base plate defining a transflective region and a plurality of holes formed in the transflective region. A portion of light beams from a light source is reflected by the transflective region out one main face of the backlight module, and a remainder of the light beams passes through the transflective region to emit from another main face of the backlight module.

A backlight module according to a preferred embodiment includes a light source, a light guide plate, and a frame. The frame includes a base plate which defines a transflective region. The transflective region defines a plurality of holes therein. A portion of light beams received from the light source is reflected by the transflective region, and a remaining portion of the light beams is transmitted through the transflective region via the holes. The frame contains the light source and the light guide plate.

In summary, a cost efficient double-sided LCD is obtained by the use of the transflective region of the frame rather than by the use of an expensive transflector.

Other advantages and novel features of embodiments of the present invention will become more apparent from the following detailed description when taken in conjunction with the accompanying drawings; in which:

DETAILED DESCRIPTION OF PREFERRED EMBODIMENTS

Figure 1:
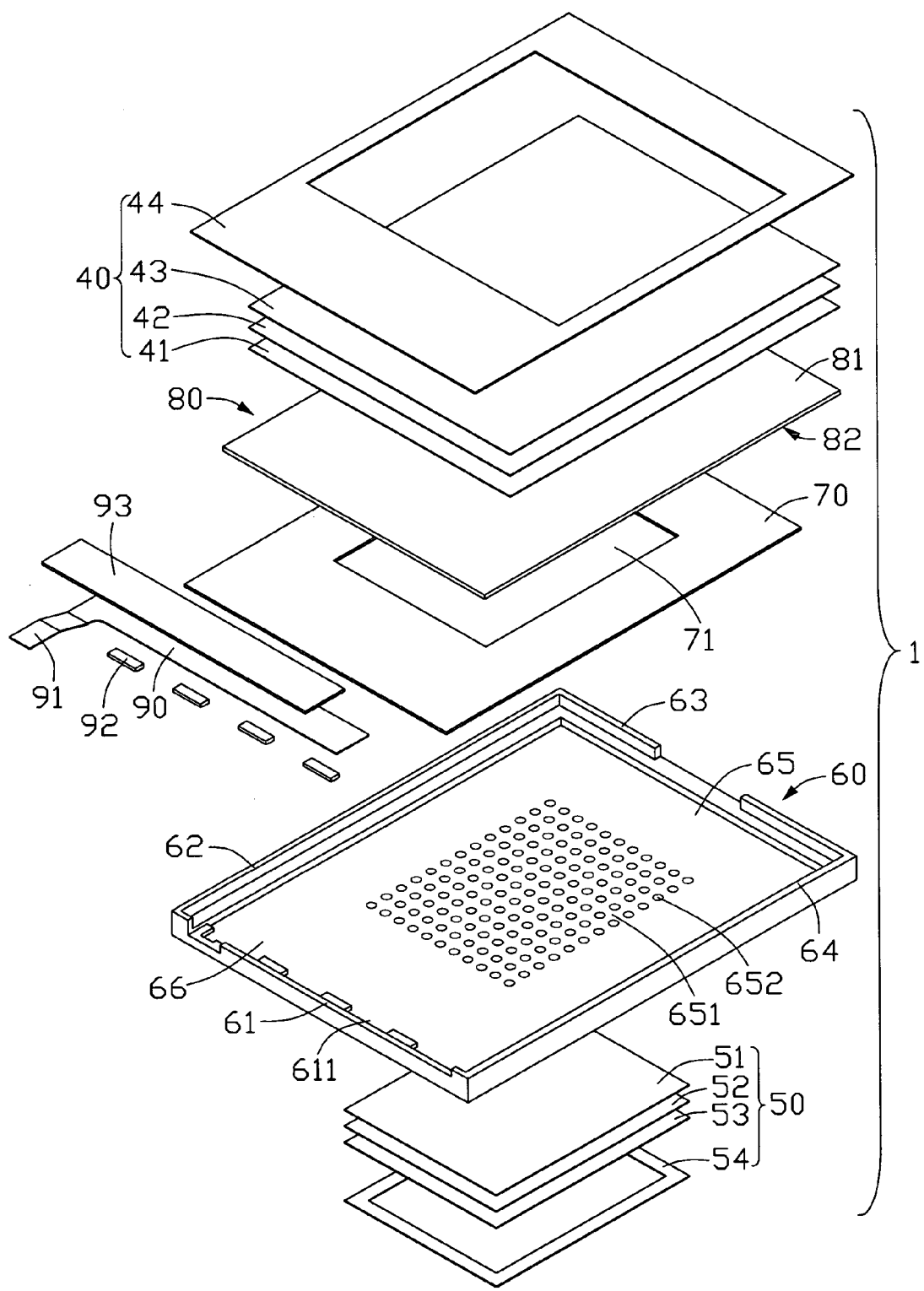
FIG. 1 is a schematic, exploded, isometric view of a backlight module of the present invention.
Figure 2:
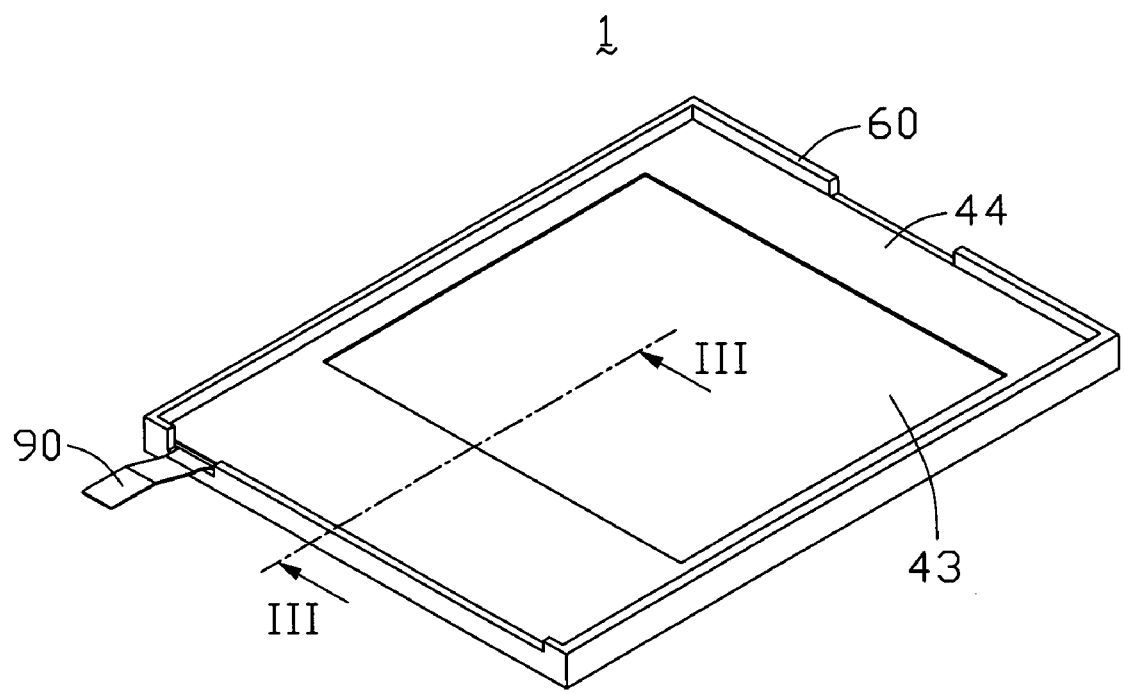
FIG. 2 is an assembled view of the backlight module of FIG. 1.

Referring to FIGS. 1 and 2, a backlight module 1 of a display device includes a frame 60, a reflector 70, a light guide plate 80, a plurality of light sources 92, a first set of optical films 40, and a second set of optical films 50.

The frame 60 includes a first side wall 61, a second side wall 62, a third side wall 63, a fourth side wall 64, and a base plate 65. A transflective region 651 is defined in the base plate 65, and a plurality of holes 652 arranged as an array is defined in the transflective region 651. The four side walls 61-64, and the base plate 65 cooperatively define a first rectangular space 66. The first rectangular space 66 contains the light guide plate 80. The light sources 92 are disposed on a circuit board 90. The first side wall 61 has a plurality of grooves 611 containing the light sources 92. The circuit board 90 is accommodated in the first rectangular space 66 at the first side wall 61. The light sources 92 are covered by a third reflector 93, which facilitates transmission of light beams emitted from the light sources 92 to the light guide plate 80.

The light guide plate 80 includes a first light-emitting surface 81, and a second light-emitting surface 82 opposite to the first light-emitting surface 81. In assembly of the frame 60 and the light guide plate 80, the second light-emitting surface 82 is adjacent to the base plate 65, and a reflector 70 is disposed between the frame 60 and the light guide plate 80. An opening 71 is defined in the reflector 70, corresponding to the transflective region 651.

The first set of optical films 40 includes a first diffuser 41, a first brightness enhancement film 42, a second brightness enhancement film 43, and a first light-shielding film 44. The first diffuser 41, the first brightness enhancement film 42, the second brightness enhancement film 43, and the first light-shielding film 44 are sequentially disposed on the first light-emitting surface 81 along a direction away from the first light-emitting surface 81.

The second set of optical films 50 includes a second diffuser 51, a third brightness enhancement film 52, a fourth brightness enhancement film 53, and a second light-shielding film 54. The second diffuser 51, the third brightness enhancement film 52, the fourth brightness enhancement film 53, and a second light-shielding film 54 are sequentially disposed on the base plate 65 corresponding to the transflective region 651 along a direction away from the base plate 65.

Figure 3:
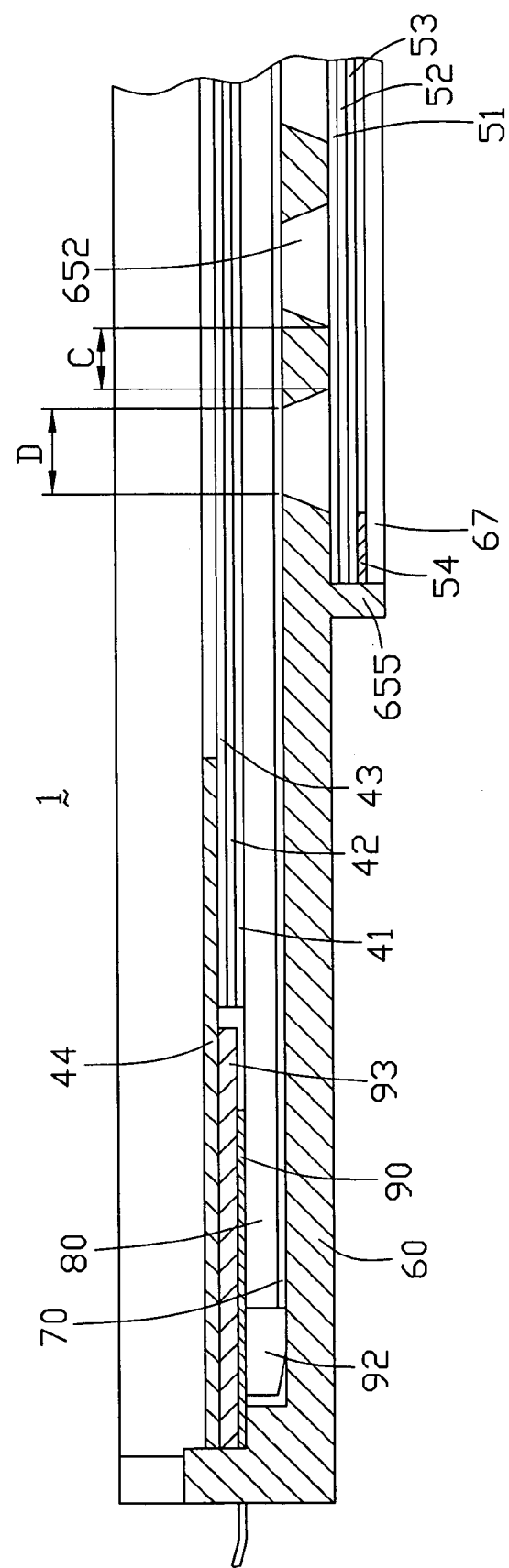
FIG. 3 is an enlarged, sectional view taken along line III-III of FIG. 2.
Figure 4:
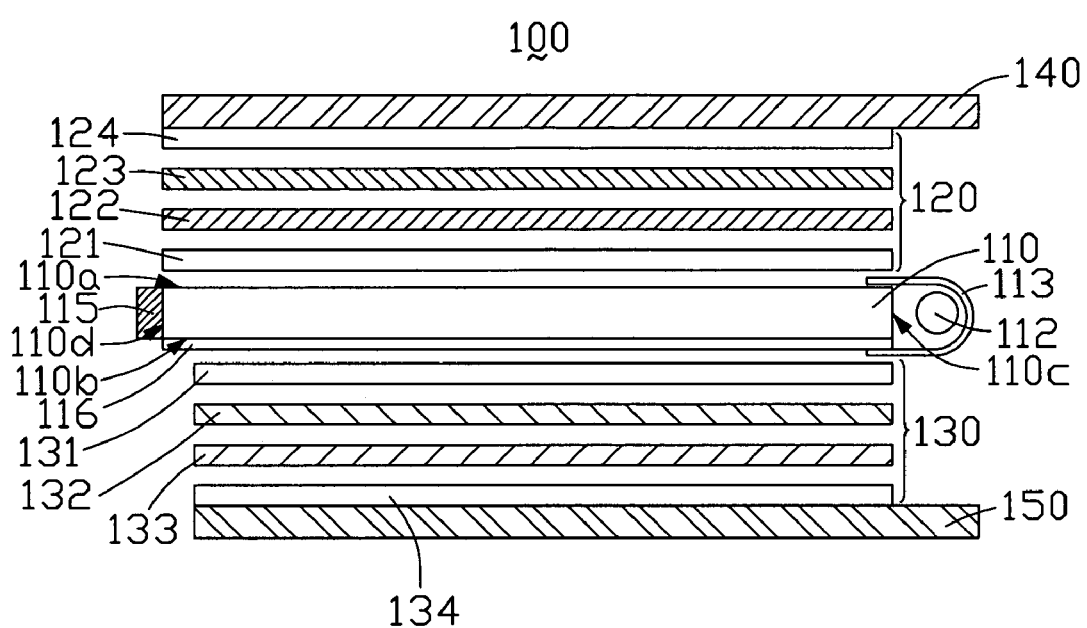
FIG. 4 is a schematic, exploded, side cross-sectional view of a conventional backlight module.

FIG. 3 shows an enlarged, sectional view taken along line III-III of FIG. 2. A rectangular side wall 655 is formed perpendicular to and under the base plate 65, and the rectangular side wall 655 and the base plate 65 cooperatively define a second rectangular space 67. The second rectangular space 67 contains the second set of optical films 50.

In the illustrated embodiment, the holes 652 are trapezoidal in cross-section. For example, the holes 652 may be circular holes, or square or rectangular holes. The holes 652 are arranged in a uniform array in the transflective region 651, and diameters of the holes 652 are all the same. In an alternative embodiment, the diameters of the holes 652 can progressively increase along a direction away from the second light-emitting surface 82. A minimum diameter D of the holes 652 is 0.3 microns, and a minimum distance C between two adjacent holes 652 is 0.02 microns.

Light beams emitted by the light source 92 enter the light guide plate 80, and subsequently the light beams emit from the first and second light-emitting surfaces 81, 82. A portion of the light beams emitted from the second light-emitting surface 82 transmit through the transflective region 651 via the holes 652, and a remaining portion of the light beams emitted from the second light-emitting surface 82 are reflected by the transflective region 651. The first set of optical films 40 receive light beams reflected by the transflective region 651, and the second set of optical films 50 receive light beams that pass through the transflective region 651. The light beams reflected by the transflective region 651 are used for displaying an image at a first liquid crystal panel, and the light beams transmitted through the transflective region 651 are used for displaying an image at a second liquid crystal panel. In this manner, the backlight module 1 has a double-sided emitting function.

The light sources 92 can be lighting emitting diodes. In other embodiments, the circuit board 90 may instead be a flexible printed circuit. The holes 652 can instead be uniformly circular, or uniformly square or rectangular.

In summary, the frame 60 contains the transflective region 651. A portion of the light beams from the light source 92 is reflected by the transflective region, and a remaining portion of said light beams is transmitted through the transflective region. The backlight module 1 employs the frame 60 to provide a double-sided emitting structure for a double-sided LCD instead of an expensive transflector.

It is to be understood, however, that even though numerous characteristics and advantages of the present embodiments have been set forth in the foregoing description, together with details of the structures and functions of the embodiments, the disclosure is illustrative only, and changes may be made in detail to the full extent indicated by the broad general meaning of the terms in which the appended claims are expressed.

We claim:

1. A backlight module, comprising:
   a light source;
   a light guide plate; and
   a frame comprising a base plate, the base plate defining a transflective region, the frame containing the light source and the light guide plate;
   a first set of optical films disposed on the light guide plate;
   wherein the transflective region defines a plurality of holes therein, the first set of optical films receives a portion of light beams received from the light source and reflected by the transflective region, and a remaining portion of the light beams from the light source is transmitted through the transflective region via the holes.

2. The backlight module as claimed in claim 1, wherein the light beams reflected by the transflective region of the base plate are for illuminating a first liquid crystal panel, and the light beams transmitted through the transflective region of the base plate are for illuminating a second liquid crystal panel.

3. The backlight module as claimed in claim 1, wherein the holes are arranged in a uniform array in the transflective region.

4. The backlight module as claimed in claim 1, wherein the light beams are input through a side edge of the light guide plate, and diameters of the holes progressively increase along a direction away from a side of the base plate corresponding to the side edge of the light guide plate.

5. The backlight module as claimed in claim 1, wherein each of the holes has a uniform cross-section or a trapezoidal cross-section.

6. The backlight module as claimed in claim 1, further comprising a second set of optical films disposed under the base plate, the second set of optical films receiving the light beams transmitted through the transflective region.

7. A display device comprising:
   a light source assembly installable in said display device and capable of providing light for said display device along a preset surface in said display device;
   a frame installable in said display device containing said light source assembly, said frame comprising a transflective region extending along said preset surface to accept said light from said light source assembly so as to partially reflect said light at a part of said region and partially transmit said light through said region without reflection of said light at another part of said region; and
   a reflector between said frame and said light source assembly, said reflector defining an opening corresponding to said transflective region.

8. The display device as claimed in claim 7, wherein said region comprising at least one human-viewable hole to perform as said another part of said region for transmission of said light through said region.

9. The display device as claimed in claim 8, wherein said at least one hole of said region of said frame is arranged as an array of holes.

10. The display device as claimed in claim 8, wherein said at least one hole of said region of said frame has a trapezoidal cross-sectional shape.

11. The display device as claimed in claim 7, wherein said frame defines space therein for accommodating said light source assembly.

12. The display device as claimed in claim 7, further comprising a first set of optical films disposed on said light source assembly, said first set of optical films receiving said light reflected by said transflective region.

13. The display device as claimed in claim 12, further comprising a second set of optical films disposed beside said frame opposite to said first set of optical films, said second set of optical films receiving said light transmitted through said transflective region.

14. A backlight module, comprising:
   a light source;
   a light guide plate;
   a frame comprising a base plate, the base plate defining a transflective region, the frame containing the light source and the light guide plate; and
   a reflector between the base plate and the light guide plate, the reflector defining an opening corresponding to the transflective region;
   wherein the transflective region defines a plurality of holes therein, a portion of light beams received from the light source is reflected by the transflective region, and a remaining portion of the light beams is transmitted through the transflective region via the holes.

* * * * *